US008673513B2

(12) United States Patent
Reiser

(10) Patent No.: US 8,673,513 B2
(45) Date of Patent: Mar. 18, 2014

(54) DETERMINING DURATION OF FUEL CELL SHUTDOWN HYDROGEN STABILIZATION BY COUNTING COULOMBS

(75) Inventor: Carl A. Reiser, Stonington, CT (US)

(73) Assignee: United Technologies Corporation, Hartford, CT (US)

( * ) Notice: Subject to any disclaimer, the term of this patent is extended or adjusted under 35 U.S.C. 154(b) by 426 days.

(21) Appl. No.: 12/998,452

(22) PCT Filed: Dec. 4, 2008

(86) PCT No.: PCT/US2008/013376

§ 371 (c)(1), (2), (4) Date: Apr. 21, 2011

(87) PCT Pub. No.: WO2010/065017

PCT Pub. Date: Jun. 10, 2010

(65) Prior Publication Data

US 2011/0200901 A1 Aug. 18, 2011

(51) Int. Cl.
*H01M 8/04* (2006.01)

(52) U.S. Cl.
USPC .......... 429/429

(58) Field of Classification Search
None
See application file for complete search history.

(56) References Cited

U.S. PATENT DOCUMENTS

| | | | | |
|---|---|---|---|---|
| 2002/0182456 | A1 * | 12/2002 | Condit et al. | 429/13 |
| 2005/0064258 | A1 * | 3/2005 | Fredette | 429/22 |
| 2005/0106424 | A1 * | 5/2005 | Elhamid et al. | 429/9 |
| 2006/0078780 | A1 * | 4/2006 | Margiott et al. | 429/34 |
| 2008/0032163 | A1 * | 2/2008 | Usborne et al. | 429/13 |
| 2008/0145716 | A1 * | 6/2008 | Yu et al. | 429/13 |
| 2009/0035630 | A1 * | 2/2009 | Kumada et al. | 429/25 |

* cited by examiner

*Primary Examiner* — Patrick Ryan
*Assistant Examiner* — Jose Colucci Rios
(74) *Attorney, Agent, or Firm* — M. P. Williams

(57) ABSTRACT

A process for shutting down a fuel cell power plant (5) shuts off (40) process air, recycles (44-46) air exhaust 42 to air inlets 34, and connects an auxiliary load to the stack (6). Coulombs are counted by integrating (17) current (73) or voltage (75) to the load to determine when all oxygen in the air side (10, 27, 30, 34, 42, 44-47) of the power plant is consumed and a desired concentration of hydrogen is transferred to the air side of the power plant. The speed of the shutdown processes may be increased by increasing fuel pressure (15) or adding a battery (78) in series with the auxiliary load.

15 Claims, 2 Drawing Sheets

CONTROLLER
LOAD
PWR CONDR
LOAD
AUX LOAD
ANODES
PEMS
CATHODES
FUEL
FILT
AIR
V
5
6
9
10
11
14
15
16
17
19
20
21
22
23
25
27
30
32
33
34
35
37
38
39
40
42
44
45
46
47
48
54
55
56
57
59
60
62
67
68
75
76

DETERMINING DURATION OF FUEL CELL SHUTDOWN HYDROGEN STABILIZATION BY COUNTING COULOMBS

TECHNICAL FIELD

In a process for shutting down a fuel cell stack that continues to supply hydrogen while recirculating cathode exhaust to the cathode inlet while dissipating the generated power in a resistor, the duration for continuing the hydrogen flow and cathode recycle is determined by counting the coulombs generated by the electrochemical process and transferred through the power output of the stack to the resistor. Shutdown process speed may be increased by higher fuel pressure or by a battery in series with the resistor.

BACKGROUND ART

An exemplary fuel cell shutdown process is set forth in U.S. Pat. No. 7,141,324. The process seeks to avoid the presence of oxygen during shutdown. The desired result is to extend the time that the stack can maintain a fuel-rich environment (such as greater than a 2:1 fuel to air stoichiometry).

The process disconnects the main load, connects an auxiliary load or shorting resistor, blocks the entry of oxygen from the source, such as air, while flowing hydrogen into the anodes with fuel recycling, and while recycling cathode exhaust to the cathode inlets.

When the cell voltage drops to 0.2 volts per cell, the process in the aforementioned patent assumes that substantially all of the oxygen within the cathode flow field, and any oxygen that has diffused across the electrolyte to the anode flow field will have been consumed. Once the voltage per cell reaches 0.2 volts, both the anode and the cathode receive fresh hydrogen, with both the anode and cathode recycle operative.

This has the effect of not only reducing the amount of oxygen in the cathodes by electrochemical reaction but also eventually stabilizing the cathodes and the anodes with approximately the same partial pressure of hydrogen, along with inerts, mostly nitrogen, and traces of other gases, as the oxygen is consumed.

In the aforesaid patent, the process is continued until the cathodes and anodes have hydrogen concentrations greater than 90% as determined by hydrogen concentration sensors for the anodes and cathodes. Other processes may measure the oxygen and continue the process until the oxygen is a fractional percent.

Current methods rely heavily on optimization of the shutdown procedure by tailoring it until the desired results are obtained. Essentially, such processes all attempt to consume all the oxygen in the air-side flow fields, manifolds and associated plumbing and leave sufficient hydrogen in the air-side to consume any residual oxygen and oxygen drawn in through leaks.

One factor is the precision at which the air-side hydrogen level is set at the end of the shutdown procedure. Too little hydrogen will shorten the time of a fuel-rich stoichiometry, and too much hydrogen will cause excessive emissions if the power plant is restarted soon after shutdown.

Currently available hydrogen sensors are not reliable and do not accurately represent hydrogen concentrations in all of the anodes and in all of the cathodes. The position of hydrogen sensors pose additional reliability problems.

Another problem with these processes is that they can consume more time than is desirable in automotive applications. Shutdown procedure times of greater than seconds are undesirable in vehicles.

SUMMARY

The present embodiment follows the aforementioned procedure to the point where fresh air is cut off, the auxiliary load is connected, and cathode exhaust is recycled, while fresh hydrogen is applied to the anode only with cathode recycle in operation. During this time, there may or may not be purging of anode exhaust, as explained in the aforementioned patent, which is incorporated herein by reference.

This embodiment not only accurately determines the point in time when the oxygen in the air side of the cells has been consumed, it also accurately determines the amount of hydrogen that thereafter evolves to the cathodes, and therefore the concentration of hydrogen in the cathodes as well as the anodes, in the process of stabilizing the cells with a hydrogen rich (at least two $H_2$ volumes per $O_2$ volume), non-corrosive stoichiometry.

The duration of flowing fresh hydrogen to the anodes while recycling anode and cathode exhaust to the respective anode and cathode inlets, in order to consume oxygen in the air side of the power plant, is determined by counting coulombs generated by the electrochemical reaction, either by integrating current flow to the auxiliary load resistor, or by integrating the voltage across the auxiliary load resistor (voltage being converted to current through division by the known resistance of the auxiliary load).

Once substantially all oxygen is consumed, coulombs are counted to equal the number of hydrogen molecules required to fill the air side of the stack with the desired concentration of hydrogen.

The embodiments herein accurately provide a predetermined concentration of hydrogen in the air side of the power plant at the conclusion of the shut down procedure. The embodiments herein shorten the time it takes to conduct a proper elimination of the oxygen and stabilizing the cathode and anode with an appropriate concentration of hydrogen.

A second manner of shortening the hydrogen stabilization time is to increase the pressure of fresh hydrogen provided during the shutdown procedure. A third manner of shortening the hydrogen stabilization time is to apply a DC power source, such as an automotive size battery, in series with the auxiliary resistive load, poled to assist stack current, to force more current and speed up oxygen consumption and hydrogen evolution in the cells.

Other variations will become more apparent in the light of the following detailed description of exemplary embodiments, as illustrated in the accompanying drawings.

MODE(S) OF IMPLEMENTATION

Figure 1:
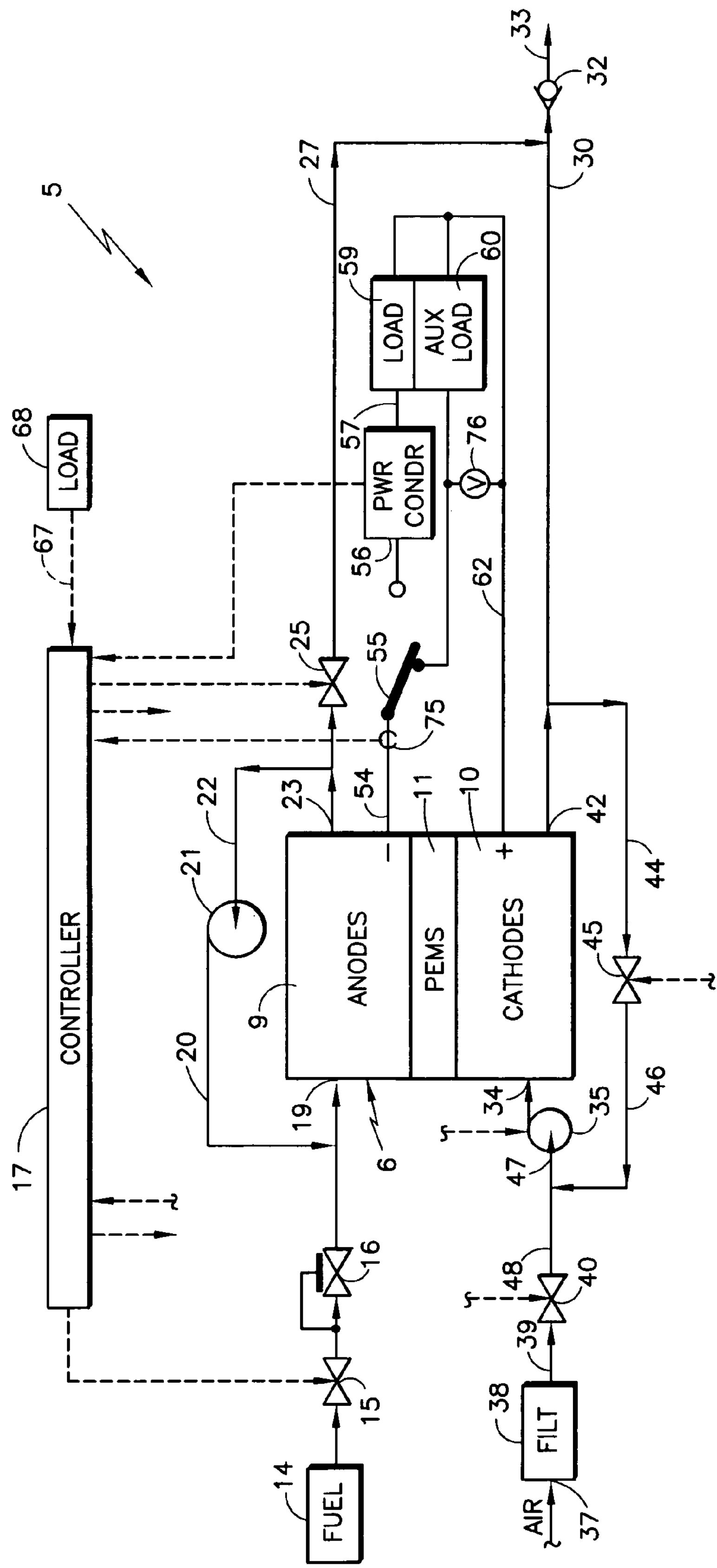
FIG. 1 is a simplified, schematic diagram of a fuel cell power plant which has a switchable auxiliary load and cathode recycle which will benefit from the present embodiments.

Referring to FIG. 1, a fuel cell power plant 5 includes a stack of fuel cells 6, each fuel cell having an anode catalyst layer, a cathode catalyst layer and a proton exchange membrane disposed between said layers. Each fuel cell also has fuel reactant gas flow field channels adjacent the anode catalyst layer, with or without an additional layer between the fuel flow field channels and the catalyst layer. Each fuel cell also has oxidant reactant gas flow field channels adjacent the cathode catalyst layer, with or without an additional layer between the oxidant reactant gas flow field channels and the cathode catalyst layer. These are known and are not shown in the drawing.

The anodes 9 and cathodes 10 are separated by proton exchange membranes 11. The anodes 9 receive fuel from a source 14 which passes through an isolation valve 15 and a pressure regulator 16. The fuel inlets 19 of the anodes also receive recycle fuel in a conduit 20 from a recycle pump 21 that is connected by a conduit 22 to the anode fuel outlets 23. The controller 17 also operates a purge valve 25 to periodically or continuously release a small portion of the anode exhaust in order to rid the fuel cells of contaminants and inerts such as nitrogen. The valve 25 is connected by a conduit 27 to an air exhaust conduit 30, through a check valve 32 to exhaust 33, which may be ambient or a controlled confinement of some sort.

The cathodes 10 receive air at inlets 34 from an air blower 35. Air is applied to the input 37 of a filter 38, the output of which in a conduit 39 is passed through an air control valve 40 that is regulated by the controller 17. The cathode outlets 42 are connected through a recycle conduit 44, a valve 45 and a conduit 46 to the inlet 47 of the air blower 35, which is also connected to the valve 40 by a conduit 48. The recycle valve 45 is opened by the controller 17 to permit recycle air to be returned over a conduit 46 to the inlet 47 of the blower 35 and the cathode air inlets 34; the recycle flow is controlled by blower speed.

The cathode outlets 42 are also connected by the conduit 30 through the check valve 32 to exhaust 33.

As an example, in the embodiment disclosed, the fuel cell stack electrical power output 54 from the anode end of the stack, indicated by a minus sign, is connectable through a switch 55 to a conventional power conditioner 56, which is shown only schematically in the drawing. The output 57 of the power conditioner 56 is connected to an actual load 59, which may be a vehicle or other electrical utilization apparatus. The switch is shown connected to an auxiliary load 60, such as that described hereinbefore with respect to a hydrogen-stabilizing shutdown procedure. As shown schematically in the drawing, the loads are connected by a return line 62 to the cathode end of the stack, indicated by a plus sign.

In the embodiment described herein, a signal 67 provided by the load 58 indicates that the stack should be shut down. The shut down signal could alternatively come from the power conditioner 56, such as when it senses a problem with the load. The controller will operate the switch 55 to shift the output of the fuel cell stack from the main load 59 to the auxiliary load 60, as shown in FIG. 1. The valve 40 is closed to block fresh air, the valve 45 is opened to recycle cathode exhaust to the cathode inlets, and fuel continues to be provided to the anodes with fuel recycle on. The electrical current being conducted to the auxiliary load 60 is integrated, first, until such time as it reaches a count of coulombs which equates to the volume of oxygen in the air side of the power plant; then it is integrated until it equates to desired hydrogen concentration in the air side.

The volume of the air side of the power plant consists of the cathode flow fields (including seal space), the manifolds, and the air pump (blower) and plumbing, including cathode recycle. The volume may, for example, consist of about 20% for the flow fields, about 65% for the manifolds, and about 10% for the pump and plumbing. The manufacturing design drawings define the volume of various parts of any power plant. Alternatively, the volume may be determined empirically.

Dry air at sea level is about 21% oxygen by volume, so the oxygen volume of the system at the start of shut down is 21% of the power plant air side volume.

In each cell, oxygen is consumed in the electrochemical process to provide electric current at the precise rate of 5.08 (10)-5 liters of oxygen per coulomb per cell. With 500 cells, for instance, the rate would be 4(10)-2 liters of oxygen per coulomb. Reciprocally, 25 coulombs will be produced for each liter of oxygen consumed. In an exemplary 500 cell power plant, the volume of the air side of the system is about 80 liters. At 21%, the oxygen volume is 16.8 liters. Therefore, the oxygen initially in the air side of the example will be consumed by producing 420 coulombs. At nearly 1 my, each cell will provide about 15 milliamps per square centimeter; with 400 cm2 per cell, 6 amps will be generated which will provide 420 coulombs in about 70 seconds, in the example.

Beginning when the inlet air is closed off and the auxiliary load is connected, the computer integrates the electric current through the auxiliary load indicated by a current sensor 75, or, by relating the voltage to the resistance of the auxiliary load (i=v/r), the computer may integrate a signal provided by a voltage transducer 76.

When the integration reaches an appropriate coulomb count (in the example, 420 coulombs), the controller 17 shifts its basis for counting: it will now count molecules of hydrogen evolved into the cathodes, by integrating the current through (or voltage) across) the auxiliary load. The hydrogen will diffuse through the membranes to the cathodes because the anodes are at a pressure about one or two psi (7 or 14 kPa) above the cathode pressure.

Current is provided at the precise rate of 1.16(10)−4 liters of hydrogen per coulomb per cell. For 500 cells, 8.0(10)−2 liters of hydrogen are evolved per coulomb. Reciprocally, 12.5 coulombs are generated per liter of evolved hydrogen.

The selected concentration, times the volume in liters, times the coulomb generation factor, will indicate the number of coulombs to be counted. For the exemplary system of 500 cells and 80 liters of air side volume, a 50% concentration of hydrogen can be assured, with continued $H_2$ supply, after generating 500 coulombs; a 90% concentration from 1620 coulombs; and so forth.

The present embodiment assures that all oxygen has been consumed from the air side so that the hydrogen concentration at the end of the process will not be depleted by dilatory oxygen, but only by oxygen infused through leaks and that a desired concentration of hydrogen remains in the air side of the power plant.

When the stabilization is complete, the hydrogen inlet valve 40 will be closed and the purge valve 25 will be closed. The fuel cell power plant is, at this stage, shut down, leaving sufficient hydrogen in the cathodes and in the anodes so as to preclude any high voltages or oxidation in the anodes or the cathodes, subject to whatever air leaks in.

In one embodiment of the invention, the time it takes to stabilize hydrogen in the cathode and anode volumes is reduced by increasing the pressure of the fuel entering the anodes from near atmospheric by a few kPa or psi, such as by between about 3.5 kPa (about 0.5 psi) and about 14 kPa (about 2 psi). This will increase the voltage, and therefore the current, to reduce the time for stabilization by up to about 20%. This expedient may be used in processes that do or do not include coulomb counting and in processes which do or do not use a battery boost described below.

Figure 2:
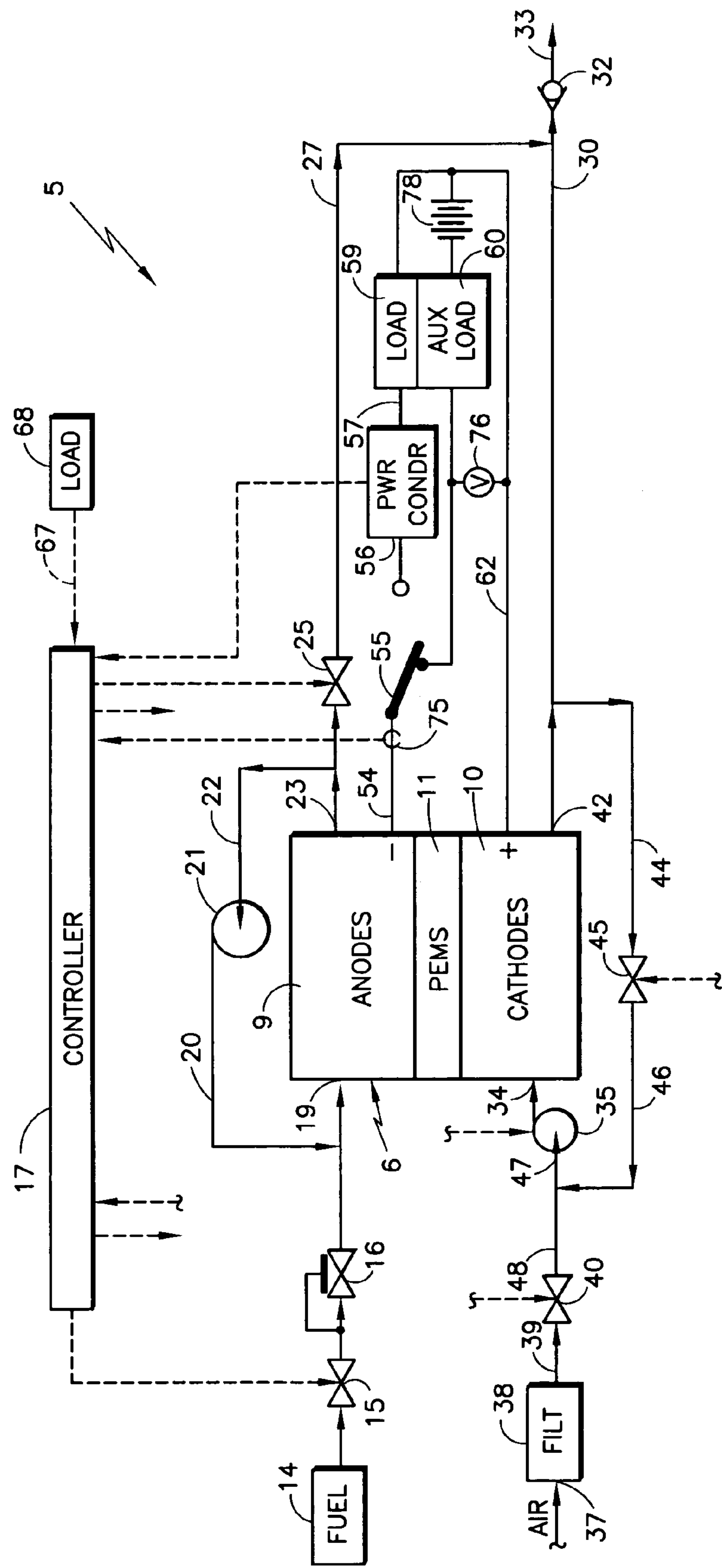
FIG. 2 is a simplified, schematic diagram of a fuel cell power plant having a battery in series with the auxiliary resistive load.

In another embodiment shown in FIG. 2, the time it takes to stabilize hydrogen in the cathode and anode volumes is reduced by providing a DC power source, such as a battery 78, in series with the auxiliary load poled to assist the fuel cell current. The battery forces higher current, thereby transferring the requisite number of coulombs faster. In a large vehicle fuel cell power plant, an air-side volume of on the order of 80 liters could be cleared of oxygen in less than 10 seconds using battery boost, as compared with over one minute without the battery boost. This expedient may be used in processes that do or do not include coulomb counting and in processes which do or do not use increased hydrogen pressure (above).

The invention claimed is:

1. A method for a proton exchange membrane fuel cell power plant (5) configured to provide power output (57) to a load (59), said method comprising:

in response to a signal (67) indicating that the fuel cell power plant should be shut down—

(a) shutting off (40) the process air supplied to air inlets of the power plant fuel cells;

(b) recycling (44-46) cathode exhaust gas (42) of the fuel cells to air inlets (34) of the fuel cells;

characterized by:

(c) disconnecting the power output (57) of the power plant from the load (59) and connecting the power output to a resistive auxiliary load (60) having a DC power source (78) connected in series therewith, polarized to assist current flow from the power output;

(d) increasing pressure of hydrogen supplied to anode inlets of the power plant fuel cells by between about 14 kPa (about 2 psi) and about 28 kPa (about 4 psi); and (e) integrating either (i) the current through the auxiliary load or (ii) the voltage across the auxiliary load, until the integration equates to consumption of substantially all oxygen in the air side of the power plant.

2. A method for a proton exchange membrane fuel cell power plant (5) configured to provide power output (57) to a load (59), said method comprising:

in response to a signal (67) indicating that the fuel cell power plant should be shut down—

(a) shutting off (40) the process air supplied to air inlets of the power plant fuel cells;

(b) recycling (44-46) cathode exhaust gas (42) of the fuel cells to air inlets (34) of the fuel cells; and (c) disconnecting the power output (57) of the power plant from the load (59) and connecting the power output to a resistive auxiliary load (60);

characterized by:

(d) integrating either (i) the current through the auxiliary load or (ii) the voltage across the auxiliary load, until the integration equates to consumption of substantially all oxygen in the air side of the power plant.

3. A method according to claim 2 further characterized by:

determining the volume of the air side of the power plant; and in that:

step (d) comprises integrating until the integration comprises 5.08(10)−5 coulombs per cell in the power plant, per liter of oxygen in the air side of the power plant at the end of step (a).

4. A method according to claim 2 further characterized by:

(f) in response to conclusion of step (d), continuing to flow hydrogen into the anode flow fields, with cathode and anode recycle on, while integrating either (i) the current through the auxiliary load or (ii) the voltage across the auxiliary load, until the integration equates to a predetermined concentration of evolved hydrogen in the air side of the power plant.

5. A method according to claim 4 further characterized in that step (f) comprises integrating until the integration comprises about 1.16(10)−4 coulombs per cell of the power plant, per liter of volume of the air side of the power plant, times the fraction of desired hydrogen concentration.

6. A method for a proton exchange membrane fuel cell power plant (5) configured to provide power output (57) to a load (59), said method comprising:

in response to a signal (67) indicating that the fuel cell power plant should be shut down—

(a) shutting off (40) the process air supplied to air inlets of the power plant fuel cells;

(b) recycling (44-46) cathode exhaust gas (42) of the fuel cells to air inlets (34) of the fuel cells;

characterized by:

(c) disconnecting the power output (57) of the power plant from the load (59) and connecting the power output to a resistive auxiliary load (60) having a DC power source (78) connected in series therewith, polarized to assist current flow from the power output.

7. A method according to claim 6 further characterized by:

(d) after step (c), integrating either (i) the current through the auxiliary load or (ii) the voltage across the auxiliary load, until the integration equates to consumption of substantially all oxygen in the air side of the power plant.

8. A method according to claim 7 further characterized by:

determining the volume of the air side of the power plant; and in that:

step (d) comprises integrating until the integration comprises 5.08(10)−5 coulombs per cell in the power plant, per liter of oxygen in the air side of the power plant at the end of step (a).

9. A method according to claim 7 further characterized by:

(e) in response to conclusion of step (d), continuing to flow hydrogen into the anode flow fields, with cathode and anode recycle on, while integrating either (i) the current through the auxiliary load or (ii) the voltage across the auxiliary load, until the integration equates to a predetermined concentration of evolved hydrogen in the air side of the power plant.

10. A method according to claim 9 further characterized in that step (e) comprises integrating until the integration comprises about 1.16(10)−4 coulombs per cell of the power plant, per liter of volume of the air side of the power plant, times the fraction of desired hydrogen concentration.

11. A method for a proton exchange membrane fuel cell power plant (5) configured to provide power output (57) to a load (59), said method comprising:

in response to a signal (67) indicating that the fuel cell power plant should be shut down—

(a) shutting off (40) the process air supplied to air inlets of the power plant fuel cells;

(b) recycling cathode exhaust gas (42) of the fuel cells to air inlets (34) of the fuel cells;

(c) disconnecting the power output (57) of the power plant from the load (59) and connecting the power output to a resistive auxiliary load (60);

characterized by:

(d) increasing pressure of hydrogen supplied to anode inlets of the power plant fuel cells by between 3.5 kPa (0.5 psi) and about 14 kPa (about 2 psi).

12. A method according to claim 11 further characterized by:

(e) after step (d), integrating either (i) the current through the auxiliary load or (ii) the voltage across the auxiliary load, until the integration equates to consumption of substantially all oxygen in the air side of the power plant.

13. A method according to claim 12 further characterized by:

determining the volume of the air side of the power plant; and in that:

step (e) comprises integrating until the integration comprises 5.08(10)−5 coulombs per cell in the power plant, per liter of oxygen in the air side of the power plant at the end of step (a).

14. A method according to claim 12 further characterized by:

(f) in response to conclusion of step (e), continuing to flow hydrogen into the anode flow fields, with cathode and anode recycle on, while integrating either (i) the current through the auxiliary load or (ii) the voltage across the auxiliary load, until the integration equates to a predetermined concentration of evolved hydrogen in the air side of the power plant.

15. A method according to claim 14 further characterized in that step (f) comprises integrating until the integration comprises about 1.16(10)−4 coulombs per cell of the power plant, per liter of volume of the air side of the power plant, times the fraction of desired hydrogen concentration.

* * * * *